(12) United States Patent
Lewark et al.

(10) Patent No.: US 11,198,335 B2
(45) Date of Patent: Dec. 14, 2021

(54) INTEGRATED-SENSOR VALVE APPARATUS

(71) Applicant: DANA HEAVY VEHICLE SYSTEMS GROUP, LLC, Maumee, OH (US)

(72) Inventors: Christopher P. Lewark, Grand Rapids, OH (US); Jason M. Sidders, Perrysburg, OH (US); Douglas D. Turner, Holland, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 727 days.

(21) Appl. No.: 16/071,605

(22) PCT Filed: Jan. 19, 2017

(86) PCT No.: PCT/US2017/014127
§ 371 (c)(1),
(2) Date: Jul. 20, 2018

(87) PCT Pub. No.: WO2017/127540
PCT Pub. Date: Jul. 27, 2017

(65) Prior Publication Data
US 2020/0262254 A1 Aug. 20, 2020

Related U.S. Application Data

(60) Provisional application No. 62/281,237, filed on Jan. 21, 2016.

(51) Int. Cl.
*B60C 23/00* (2006.01)
*B60C 29/06* (2006.01)
(Continued)

(52) U.S. Cl.
CPC ........ *B60C 23/003* (2013.01); *B60C 23/0408* (2013.01); *B60C 23/0433* (2013.01);
(Continued)

(58) Field of Classification Search
CPC ............. B60C 23/003; B60C 23/0408; B60C 23/0433; B60C 23/04; B60C 23/10; B60C 29/002; B60C 2200/06; B29L 2030/00
(Continued)

(56) References Cited

U.S. PATENT DOCUMENTS 6,742,386 B1 * 6/2004 Larson ................. B60C 23/004
340/447
7,331,222 B2 2/2008 Watabe
(Continued)

FOREIGN PATENT DOCUMENTS

CN 102729742 10/2012
CN 203027005 6/2013
(Continued)

OTHER PUBLICATIONS

European Patent Office, International Search Report with Written Opinion issued in PCT/US2017/014127, dated Apr. 7, 2017, 13 pages, European Patent Office, Rijswijk, Netherlands.

*Primary Examiner* — Eric Blount
(74) *Attorney, Agent, or Firm* — McCoy Russell LLP

(57) ABSTRACT

An assembly (8) for a central tire inflation system includes a housing having a first end and a second end. The housing defines a fluid conduit disposed through the first and second ends. The assembly also includes one or more sensors (205, 210) having a portion disposed in the fluid conduit. Further, a power source (245) is in electrical communication with the sensor. The assembly additionally includes a kinetic energy device (220) in electrical communication with the power source. The kinetic energy device may comprise a magnet (255) sliding on a guide (265). As an alternative, the kinetic energy device may comprise a turbine (275).

17 Claims, 6 Drawing Sheets

(51) Int. Cl.
  *B60C 23/04*   (2006.01)
  *B29L 30/00*   (2006.01)
  *B60C 23/10*   (2006.01)
  *B60C 29/00*   (2006.01)

(52) U.S. Cl.
  CPC ........... *B60C 29/06* (2013.01); *B29L 2030/00* (2013.01); *B60C 23/04* (2013.01); *B60C 23/10* (2013.01); *B60C 29/002* (2013.01); *B60C 2200/06* (2013.01)

(58) Field of Classification Search
  USPC .......................................... 73/146.2; 340/442
  See application file for complete search history.

(56) References Cited

U.S. PATENT DOCUMENTS

| | | | |
|---|---|---|---|
| 7,683,769 B2 | 3/2010 | Saitou | |
| 8,742,912 B2 | 6/2014 | Blanchard | |
| 9,579,936 B2* | 2/2017 | Brushaber | G01N 27/72 |
| 9,588,019 B2* | 3/2017 | Brushaber | B60C 23/003 |
| 9,694,633 B2* | 7/2017 | Chen | B60C 23/10 |
| 10,243,136 B2* | 3/2019 | Ghanbari | H02N 2/188 |
| 2004/0007302 A1 | 1/2004 | Hamilton | |
| 2007/0063829 A1 | 3/2007 | Chien | |
| 2007/0151334 A1* | 7/2007 | Serra | B60T 8/1725 73/146 |
| 2008/0216567 A1* | 9/2008 | Breed | B60N 2/888 73/146.5 |
| 2009/0192667 A1 | 7/2009 | Burreson | |
| 2012/0218095 A1* | 8/2012 | Zhou | B60C 23/003 340/447 |
| 2015/0239309 A1 | 8/2015 | Root | |

FOREIGN PATENT DOCUMENTS

| | | |
|---|---|---|
| CN | 104669956 | 6/2015 |
| DE | 202007017617 | 4/2009 |
| EP | 2465712 | 6/2012 |
| WO | 2002036369 | 5/2002 |
| WO | 2009057214 | 5/2009 |
| WO | 2015103018 | 7/2015 |

* cited by examiner

INTEGRATED-SENSOR VALVE APPARATUS

RELATED APPLICATIONS

The present application claims benefit to U.S. Provisional Patent Application No. 62/281,237 filed on Jan. 21, 2016, which is incorporated herein by reference in its entirety.

BACKGROUND

The present disclosure relates to a valve apparatus and more particularly to a wheel valve apparatus utilized in a tire inflation system. Vehicle tire inflation systems provide the versatility of adjusting tire pressures while a vehicle is stationary or in motion.

Certain types of vehicles, such as, but not limited to, commercial and off-highway vehicles, require that wheel assembly tire pressures be periodically adjusted for optimal performance. For example, the tire pressure of one or more wheel assemblies in fluid communication with a tire inflation system may be manually and/or automatically decreased to increase tire traction, or increased to reduce rolling resistance and increase the vehicle's fuel efficiency and tire life-span. In addition, tire inflation systems increase the maneuverability of a vehicle over differing terrains and reduce maintenance requirements.

The optimal performance of certain vehicles requires that the wheel assembly tire temperature be periodically monitored. A tire temperature above a predetermined value may indicate an undesirable tire quality or objectionable tire condition. Further, detecting the overheating of a tire may be utilized to predict a near term tire failure.

In certain applications, it is desirable to determine the tire pressure before adjusting the tire pressure of a wheel assembly. Conventional systems may include a pressure sensor for determining tire pressure. However, in conventional systems, the pressure sensor may be provided in a location central to the vehicle. The location of the conventional pressure sensor requires pressurizing the air seals in the tire inflation system in order to measure the tire pressure. Frequently pressurizing the air seals of a tire inflation system causes additional wear on the air seals which can lead to a failure of the air seals and the tire inflation system.

Therefore, it would be advantageous to develop an apparatus that overcomes the aforementioned issues.

SUMMARY

The present disclosure provides an assembly for a central tire inflation system including a housing having a first end and a second end. The housing defines a fluid conduit disposed through the first and second ends. The assembly may also include one or more sensors having a portion disposed in the fluid conduit. A power source is in electrical communication with the sensor. The assembly additionally includes a kinetic energy device in electrical communication with the power source.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION OF THE INVENTION

Figure 1:
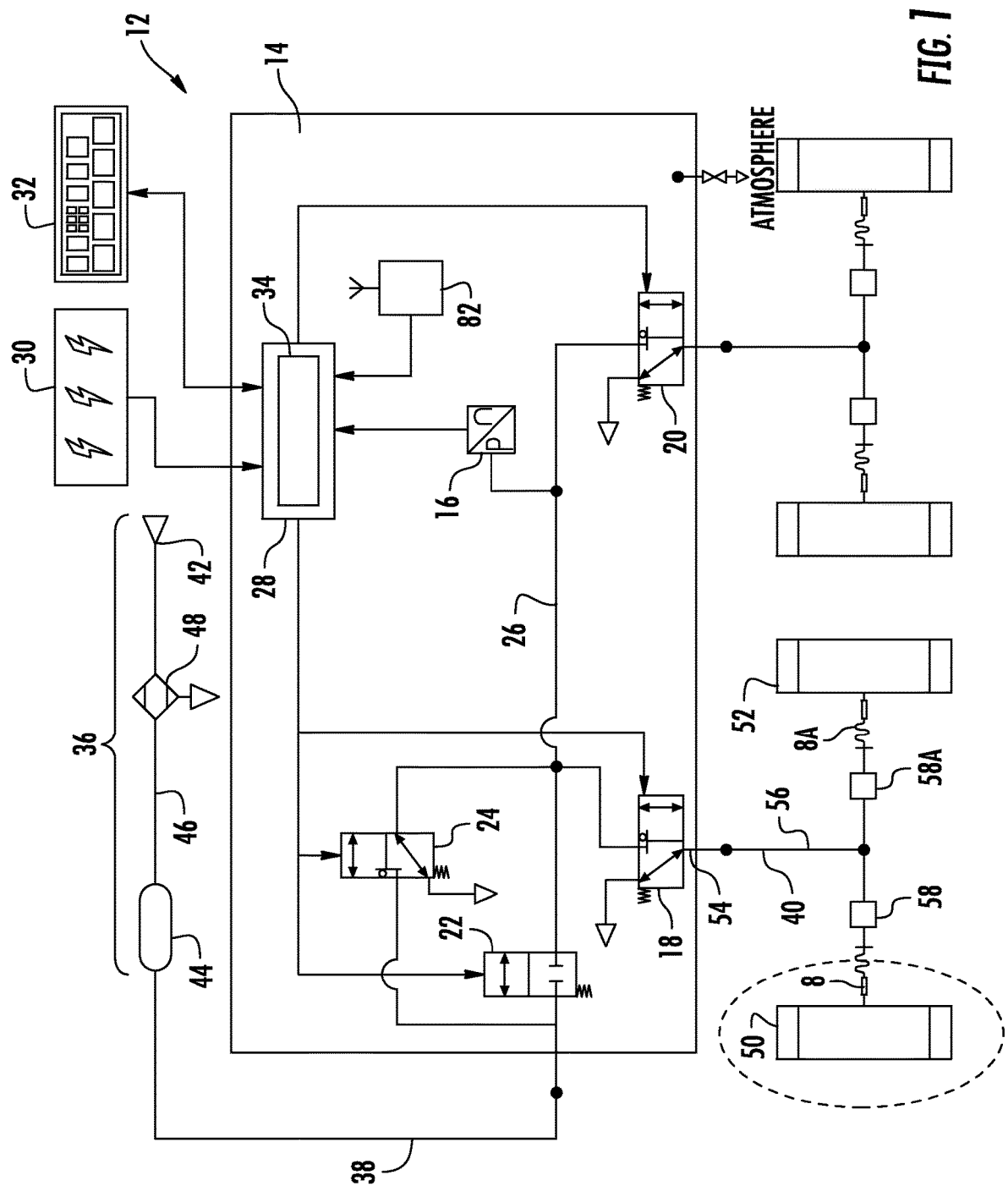
FIG. 1 depicts a schematic view of a tire inflation system according to an embodiment of the presently discloses subject matter.

It is to be understood that the invention may assume various alternative orientations and step sequences, except where expressly specified to the contrary. It is also to be understood that the specific assemblies and methods illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise. Also, although they may not be, like elements in various embodiments may be commonly referred to with like reference numerals within this section of the application.

Embodiments of a tire inflation system 12 are described below. The tire inflation system 12 may be a central tire inflation system (CTIS) for a commercial vehicle. Additionally, the tire inflation system 12 described herein may have applications in both light duty and heavy duty vehicles, and for passenger, commercial, and off-highway vehicles. It would be understood by one of ordinary skill in the art that the tire inflation system 12 also has industrial, locomotive, military, agricultural, and aerospace applications.

The tire inflation system 12 will be described with reference to a pressurized fluid. In certain embodiments, the pressurized fluid of the tire inflation system 12 may air. In this disclosure, the terms pressurized fluid and air may be utilized interchangeably; however, pressurized fluids other than air may be utilized in the tire inflation system 12. In an embodiment, the tire inflation system 12 may only have the ability to increase one or more tire pressures. However, in an embodiment the tire inflation system 12 may have the ability to increase and decrease one or more tire pressures.

A schematic depiction of an embodiment of the tire inflation system 12 is illustrated in FIG. 1. The tire inflation system 12 may comprise a control unit 14. The control unit 14 may comprise a pressure sensor 16 for measuring fluid pressure in a portion of the tire inflation system 12. In an embodiment, the control unit 14 also comprises a plurality of valve assemblies 18, 20, 22, 24, which may be of the solenoid variety, and a first fluid conduit 26 for controlling the flow of, and directing, pressurized fluid through the control unit 14.

It will be recognized by those familiar in the relevant art that the control unit 14 may comprise a mechatronic control unit (MCU) or a pneumatic control unit (PCU), but is not limited thereto.

The control unit 14 also comprises an electronic control portion 28. The electronic control portion may receive input signals from the pressure sensor 16, a power supply 30, and one or more additional sensors (not depicted) such as, for example, a load sensor and a speed sensor. The electronic control portion 28 may also receive input signals from an operator control device 32. Further, the electronic control portion 28 may receive input signals from an integrated sensor apparatus 8. The electronic control portion 28 may include a microprocessor 34 operating under the control of a set of programming instructions, which may also be referred to as software. The electronic control portion 28 may include a memory (not depicted) in which programming instructions are stored. The memory can also store identification codes, tire pressure records and/or user inputs over a period of time.

The electronic control portion 28 may output signals to the valve assemblies 18, 20, 22, 24 to open or close the valve assemblies 18, 20, 22, 24. The electronic control portion 28 may also output signals to a display device (not depicted). The display device may be included as a part of the operator control device 32 or may be included in a freestanding device.

The control unit 14 selectively communicates with fluid supply 36 via a fluid supply circuit 38. The pressure sensor 16 measures the pressure of the fluid supply 36 via the fluid supply circuit 38 and the first fluid conduit 26. The control unit 14 may also comprise a control valve assembly 24. The control valve assembly 24 may be provided with an orifice which is smaller than the orifice of the supply valve assembly 22 and is utilized to provide a bleed of fluid from the fluid supply 36 to a fluid control circuit 40.

The fluid supply 36, in conjunction with the control unit 14, is utilized to check the tire pressure and, if needed or desired, increase and/or decrease the tire pressure. The fluid supply 36 may comprise a compressor 42 attached to the vehicle. In an embodiment, the fluid supply 36 also comprises a reservoir 44 such as, for example, a wet tank. The compressor 42 is in fluid communication with the reservoir 44 via a supply conduit 46. The compressor 42 supplies pressurized fluid to the reservoir 44 for storage therein. Pressurized fluid from the fluid supply 36 is provided to the fluid supply circuit 38 via the reservoir 44. In certain embodiments, a drier 48 is provided for removing water from the fluid supply 36. A filter (not depicted) may also be interposed in the fluid supply circuit 38 or the supply conduit 46.

The control unit 14 is also selectively in fluid communication with the fluid control circuit 40. The fluid control circuit 40 is utilized to provide fluid communication between the control unit 14 and one or more tires 50, 52. In an embodiment, fluid communication between the control unit 14 and the fluid control circuit 40 is controlled by opening or closing a channel valve assembly 18.

Each tire 50, 52 contains fluid at a certain pressure which may hereinafter be referred to as tire pressure. In an embodiment, the tire pressure is equal to a target tire pressure. After the target tire pressure is selected, it is programmed into the control unit 14. If it is determined that the tire pressure is less than the target tire pressure, the tire pressure can be increased. If it is determined that the tire pressure is greater than the target tire pressure, the tire pressure can be decreased.

The tire inflation system 12 and the integrated sensor apparatus 8 are described intra with reference to the tire pressure of the tire 50. However, the tire inflation system 12 may at certain times be in fluid communication with a plurality of tires.

As illustrated in FIG. 1, the fluid control circuit 40 comprises an integrated sensor apparatus 8. The fluid control circuit 40 is described herein with reference to one integrated sensor apparatus 8. However, it should be appreciated that the fluid control circuit 40 may comprise a plurality of the integrated sensor apparatus 8, 8A. For example, the integrated sensor apparatus 8 may be associated with the tire 50 and a second integrated sensor apparatus 8A may be associated with the tire 52. In an embodiment, the integrated sensor apparatus 8 and the integrated sensor apparatus 8A are similarly configured. However, in an embodiment, the integrated sensor apparatus 8 and the integrated sensor apparatus 8A each include a unique identification code. The fluid control circuit 40 may also comprise one or more fluid conduits 54, 56 and one or more rotary assemblies 58, 58A. In certain embodiments, the one or more rotary assemblies 58, 58A include one or more air seals.

Figure 2:
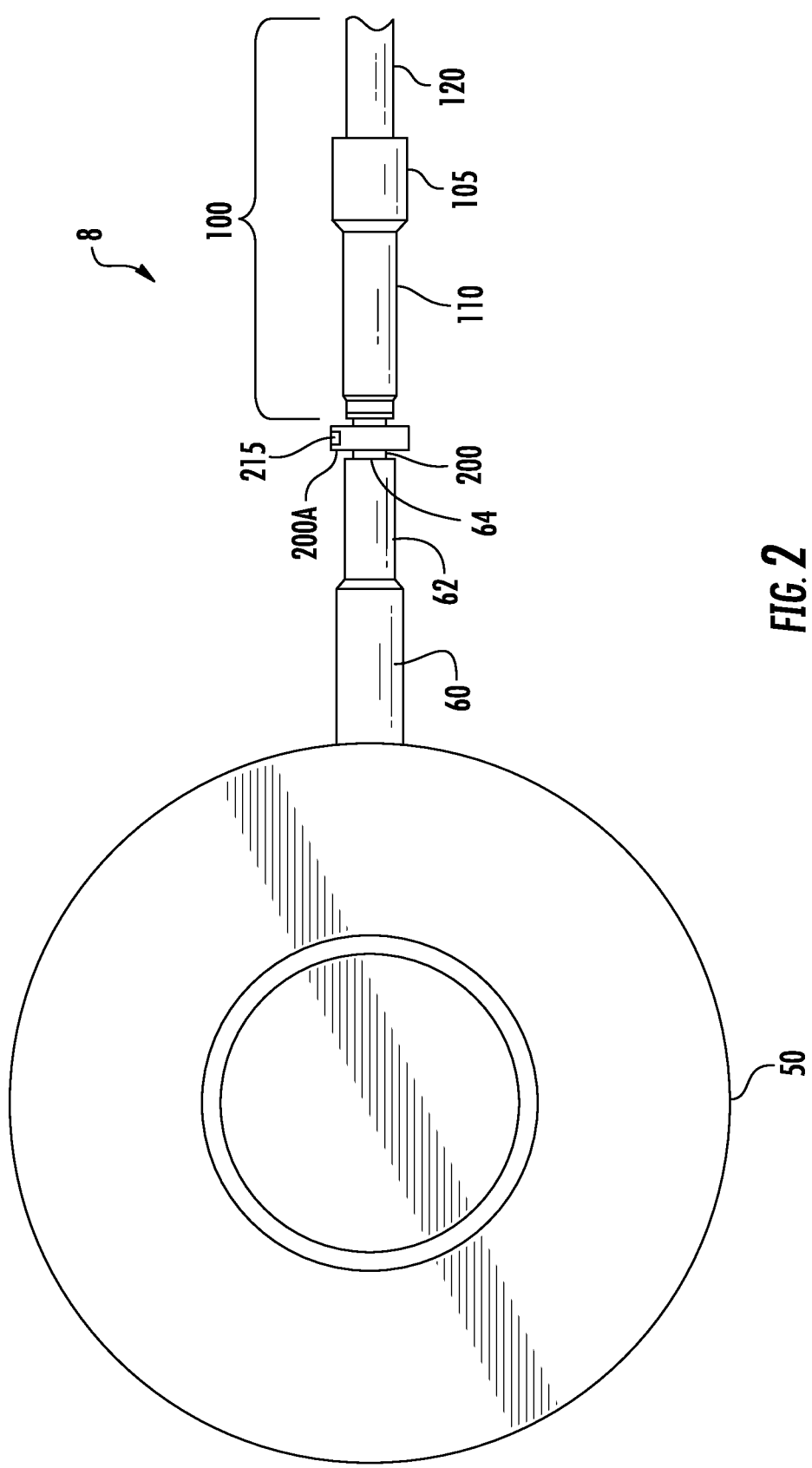
FIG. 2 depicts an enlarged plan view of a portion of the tire inflation system of FIG. 1.

Referring now to FIG. 2, a tire stem 60 extends out from the tire 50. The tire stem 60 comprises one or more hollow cylindrical portions 62. In an embodiment, each cylindrical portion 62 has a generally smooth, constant diameter, outer surface. A threaded portion may be provided near a first end 64 of the tire stem 60. The integrated sensor apparatus 8 may be engaged with the tire stem 60 at the tire stem first end 64. When a threaded portion is provided on the tire stem 60, the integrated sensor apparatus 8 may include complimentary threads for engaging the tire stem 60.

A fluid conduit extends through the one or more tire stem cylindrical portions 62. The fluid conduit is utilized to direct pressurized fluid to and from the tire 50. At the first end 64, the tire stem 60 is in fluid communication with the integrated sensor apparatus 8. At a second end, the tire stem 60 is in fluid communication with the tire 50.

A tire valve (not depicted) may be housed within the fluid conduit of the tire stem 60. The tire valve may operate as a check valve that opens when pressure in the fluid control circuit 40 (see FIG. 1) is greater than the tire pressure. In an embodiment, the tire valve may be of the Schrader variety. In certain embodiments, the tire valve is removed from the tire stem 60 prior to the coupling of the integrated sensor apparatus 8 with the tire stem 60. In embodiments where the tire valve is not removed, the integrated sensor apparatus 8 may comprise a member to actuate the tire valve so that the tire, and the pressurized fluid contained therein, are in continuous fluid communication with the integrated sensor apparatus 8.

The integrated sensor apparatus 8 comprises an assembly 100. In an embodiment, the assembly 100 is as described in WO 2015/103018, the entire disclosure of which is incorporated herein by reference.

As described in WO 2015/103018, the assembly 100 may comprise a first valve housing 105 and a second valve housing 110. In one embodiment, the first and second valve housings 105, 110 may be unitary and integral; in another embodiment, the first and second valve housings 105, 110 may be provided as separate components which are coupled together. The first and second valve housings 105, 110 may be manufactured of a metallic material or formed of other materials known to persons familiar with the art.

Figure 3:
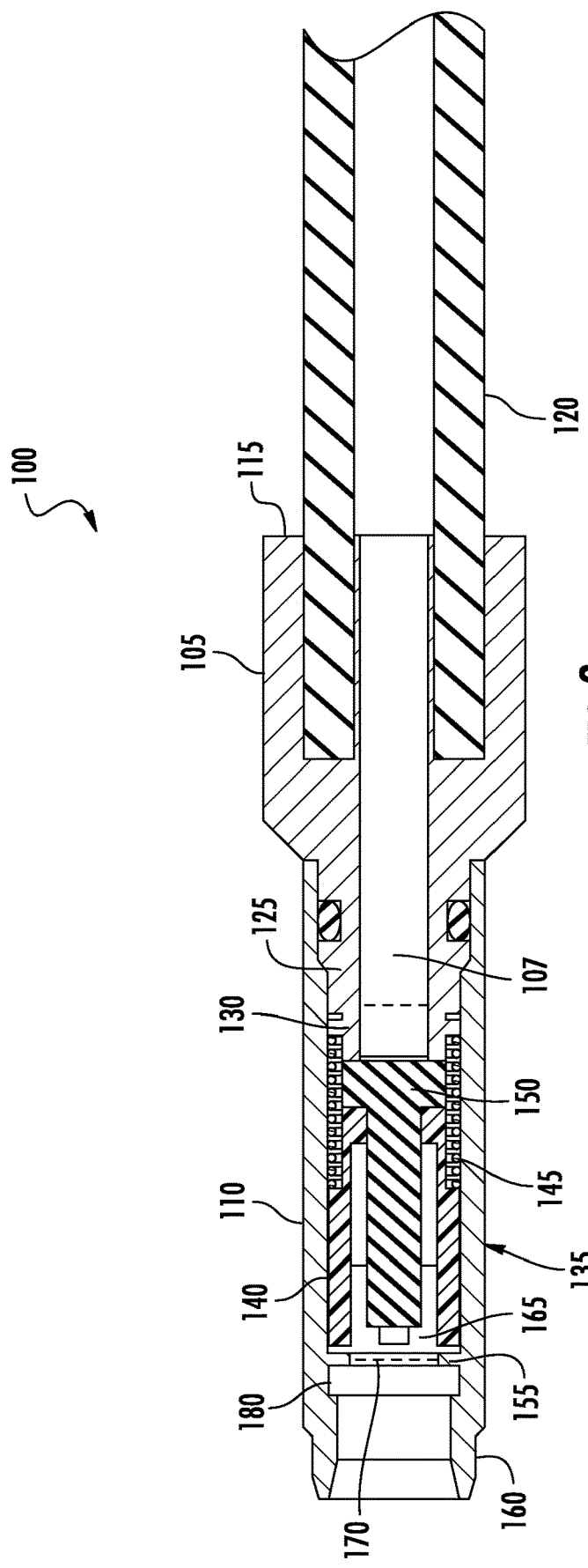
FIG. 3 depicts a portion of the integrated sensor apparatus illustrated in FIG. 1.

As illustrated in FIG. 3, the first valve housing 105 comprises a first end 115 coupled with a hose 120. A first housing second end 125 comprises a cap portion 130 coupled with the second valve housing 110. In certain embodiments, the second valve housing 110 is coupled with the cap portion 130 via a threaded connection. In an embodiment, an outer diameter of the first housing first end 115 is greater than an outer diameter of the cap portion 130.

The hose 120 is in fluid communication with a valve assembly 135 via a perforation 107 in the first valve housing 105, which hereinafter may also be referred to as the "cap perforation 107." On an opposite end, the hose 120 is in fluid communication with the remaining portion of the fluid control circuit 40.

The first housing cap portion 130 and the second valve housing 110 are provided as portions of the valve assembly 135. The valve assembly 135 also comprises a shuttle 140 disposed within the second valve housing 110. A biasing member 145 is disposed between the first housing cap portion 130 and the shuttle 140.

The valve assembly shuttle 140 is biased by the biasing member 145 and, as described in WO 2015/103018, is moveable from a closed position to an open position, and vice versa. The valve assembly 135 is utilized to permit or prevent fluid communication with the tire 50. The valve assembly shuttle 140 comprises a sealing member 150 that sealingly contacts the first housing cap portion 130 when the valve assembly 135 is in the closed position.

In an embodiment, the second valve housing 110 further comprises an annular radial projection 155 and a stem portion 160. The second valve housing 110 inner surface and the annular radial projection 155 define a chamber 165. The annular radial projection 155 is in a perpendicular relationship with the second valve housing 110 inner surface. The annular radial projection 155 defines a perforation 170, which hereinafter may also be referred to as the "base perforation 170." The base perforation 170 extends through the annular radial projection 155 and places the chamber 165 in communication with the stem portion 160.

The base perforation 170 is shaped to militate against pressure losses that occur as fluid flows through an orifice constriction, and shaped to set a relative flow rate of the fluid that enters the chamber 165 or the stem portion 160. In an embodiment, the base perforation 170 has a variable diameter which may comprise a generally hourglass shape.

In an embodiment, as illustrated in FIG. 3, an inner surface of the stem portion 160 includes a groove 180 formed therein for engaging a filter (not depicted) and/or a seal member (not depicted). The seal member provides a seal between the assembly 100 and a third housing 200 (see FIGS. 2 and 4-6). In an embodiment, the seal member may be a ring-shaped face seal. In another embodiment, the inner surface of the stem portion 160 includes a threaded portion (not depicted) for engaging a complimentarily threaded portion formed on the third housing 200. In other embodiments, the second valve housing 110 and the third housing 200 may be formed in a unitary manner.

Figure 4:
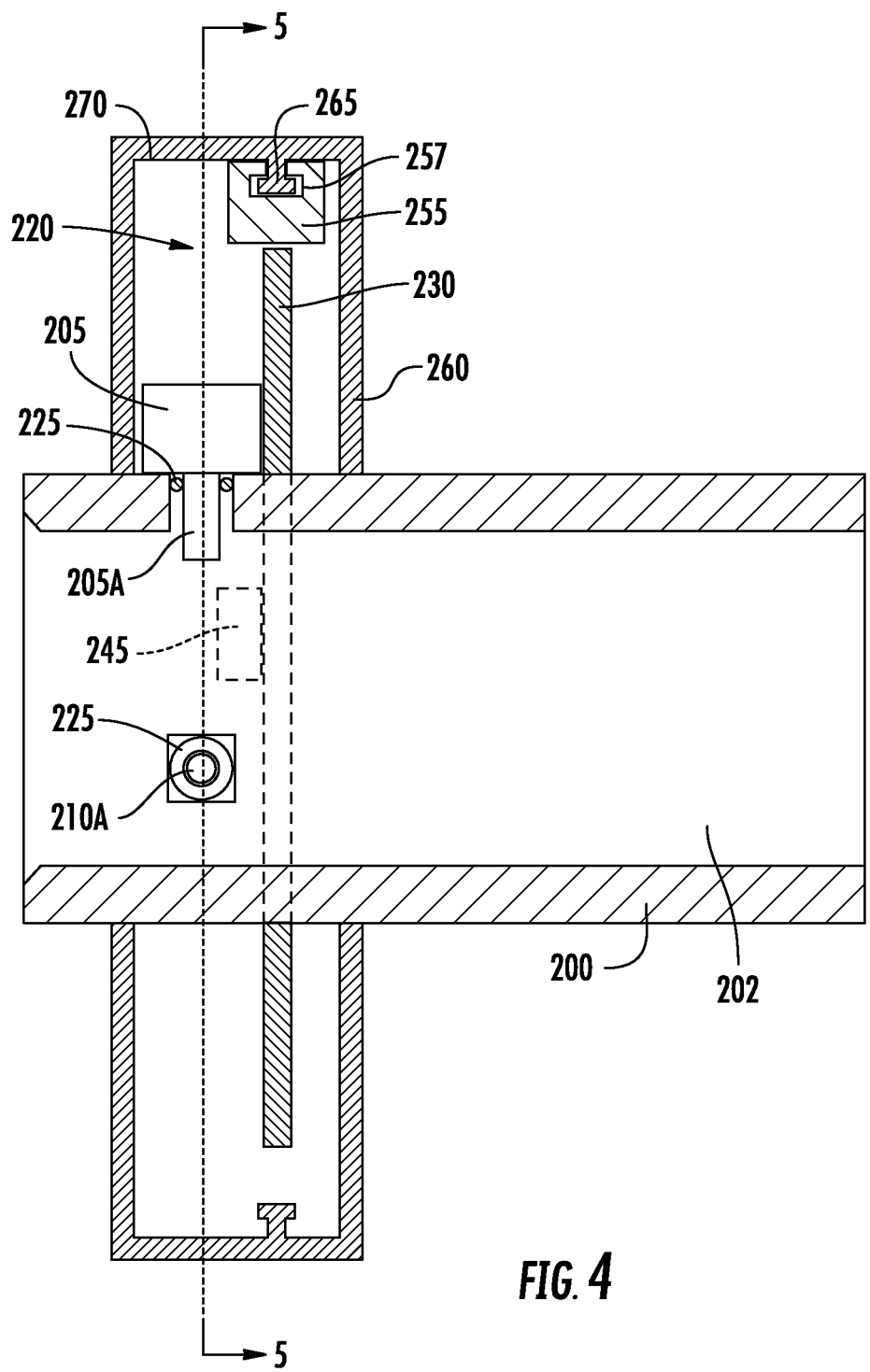
FIG. 4 depicts a cross section of a portion of the integrated sensor apparatus according to an embodiment of the presently discloses subject matter.
Figure 5:
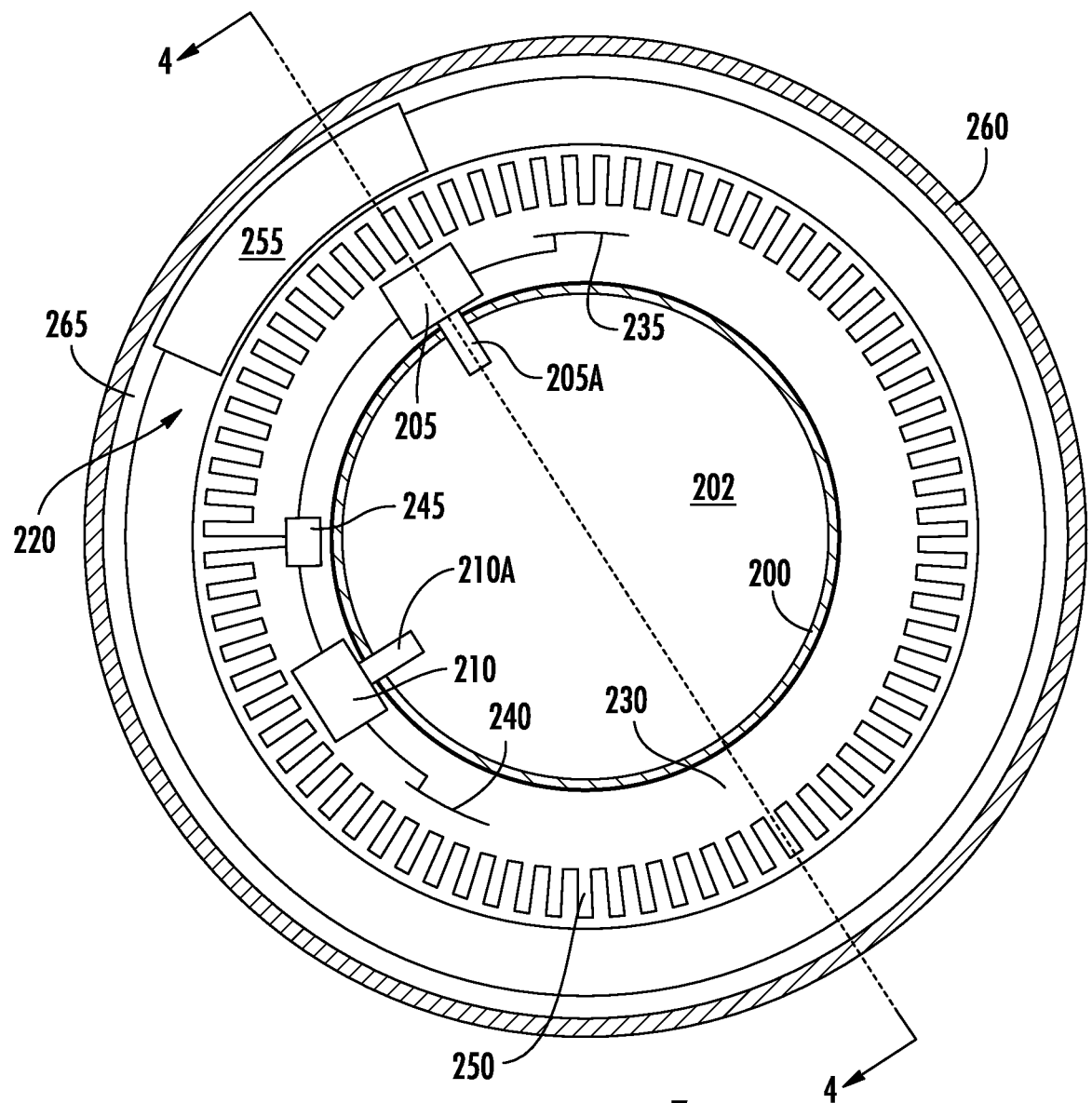
FIG. 5 depicts a cross section of the portion of the integrated sensor apparatus illustrated in FIG. 4.
Figure 6:
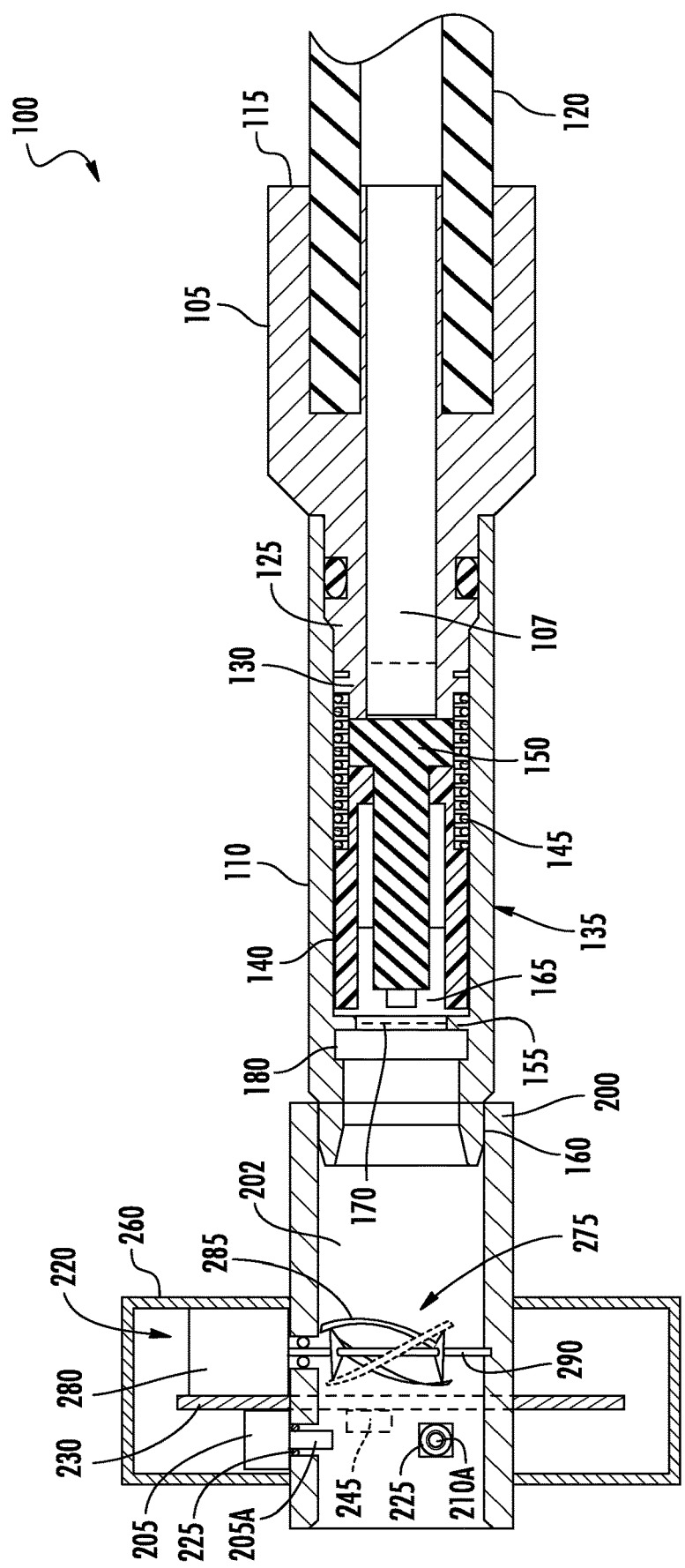
FIG. 6 depicts another a cross section of a portion of the integrated sensor apparatus according to an embodiment of the presently discloses subject matter.

As illustrated in FIGS. 2 and 6, the third housing 200 is aligned with the second valve housing 110 and the tire stem 60. The third housing 200 is also coupled with the tire stem 60. As illustrated in FIGS. 4-6, the third housing 200 comprises a fluid conduit 202 for permitting fluid communication with the tire stem 60. The third housing 200 fluid conduit 202 is in fluid communication with the fluid conduit that extends through the tire stem 60. In embodiments where the tire valve is not removed from the tire stem 60, the integrated sensor apparatus 8 may comprise a member (not depicted) to actuate the tire valve so that the tire, and the pressurized fluid contained therein, are in continuous fluid communication with the integrated sensor apparatus 8. Therefore, the third housing 200 fluid conduit 202 is in continuous fluid communication with the pressurized fluid contained in the tire 50.

A pressure sensor 205 and a temperature sensor 210 are in fluid communication with the third housing 200 fluid conduit 202. The pressure sensor 205 and the temperature sensor 210 may be disposed within the third housing 200 to enable fluid communication between the pressure and temperature sensors 205, 210 and the third housing 200 fluid conduit 202. Alternatively, the pressure and temperature sensors may be separately encapsulated (not depicted), where the separate encapsulation permits fluid communication between the pressure and temperature sensors 205, 210 and the third housing 200 fluid conduit 202.

Pressure sensors and temperature sensors known in the art, and suitable for use in a pneumatic system, may be utilized in the integrated sensor apparatus 8. The pressure sensor 205 and the temperature sensor 210 may be provided as separate portions of a sensor array. The pressure sensor 205 measures the pressure of the pressurized fluid in the fluid conduit 202 of the third housing 200. The temperature sensor 210 measures the temperature of the pressurized fluid in the fluid conduit 202 of the third housing 200.

As illustrated in FIG. 4, in an embodiment, the pressure and temperature sensors 205, 210 may have a portion 205A, 210A in fluid communication with the third housing fluid conduit 202. The portion 205A, 210A protrudes through the wall of the third housing 200. In an embodiment, a seal 225 disposed about each portion 205A, 210A may be utilized to maintain pressurization of the fluid conduit 202.

Locating the pressure and temperature sensors 205, 210 at an end of the third housing 200 adjacent the tire stem 60 increases the accuracy of the sensor 205, 210 measurements. Increasing the accuracy of the sensor 205, 210 measurements reduces the sensor calibration required and therefore decreases the possibility of producing inaccurate sensor 205, 210 information. Positioning a sensor portion 205A, 210A directly in the fluid flow also eliminates the risk that a vacuum may develop around the sensors, which would impede the accuracy of the sensor 205, 210 measurements.

The pressure and temperature sensors 205, 210 may be in electrical communication with a printed circuit board 230. The printed circuit board 230 may comprise an annular stator disposed about the third housing 200.

After measuring the pressure, the pressure sensor 205 provides a signal to the electronic control portion 28 corresponding to the pressure of the pressurized fluid in the fluid conduit of the third housing 200. Because the third housing 200 fluid conduit 202 is in continuous fluid communication with pressurized fluid contained in the tire 50 via the fluid conduit that extends through the tire stem 60, the pressure of the pressurized fluid in the fluid conduit 202 of the third housing 200 is equal to or substantially equal to the tire pressure. Thus, the signal provided to the electronic control portion 28, is indicative of the tire pressure.

In an embodiment, the pressure sensor 205 is of the wireless variety. When the pressure sensor 205 is a wireless pressure sensor, the signal provided by the pressure sensor 205 is transmitted to the electronic control portion 28 without a wire connecting the pressure sensor 205 and the electronic control portion 28. The signal transmitted to the electronic control portion 28 may be in the form of one or more radio waves. In this embodiment, the pressure sensor 205 may be in communication with a radio transmitter. As illustrated in FIG. 5, the printed circuit board 230 may include a trace antenna 235 for transmitting the signal provided by the pressure sensor 205. In an embodiment, the signal transmitted to the electronic control portion 28 may be in the form of Wi-Fi radio waves. Where the signal transmitted to the electronic control portion 28 is in the form of Wi-Fi radio waves, the pressure sensor 205 and the electronic control portion 28 may communicate peer-to-peer, or communicate via a wireless access point or hub (not depicted).

After measuring the temperature, the temperature sensor 210 provides a signal to the electronic control portion 28 corresponding to the temperature of the pressurized fluid in the fluid conduit of the third housing 200. Because the third housing 200 fluid conduit 202 is in continuous fluid communication with pressurized fluid contained in the tire 50, via the fluid conduit that extends through the tire stem 60, the temperature of the pressurized fluid in the fluid conduit of the third housing 200 is equal to, or substantially equal to, the temperature of the pressurized fluid housed in the tire 50. Thus, the signal provided to the electronic control portion 28, is indicative of the temperature of the pressurized fluid contained in the tire 50.

In an embodiment, the temperature sensor 210 is of the wireless variety. When the temperature sensor 210 is of the wireless variety, the signal provided by the temperature sensor 210 is transmitted to the electronic control portion 28 without a wire connecting the temperature sensor 210 and the electronic control portion 28. The signal transmitted to the electronic control portion 28 may be in the form of one or more radio waves. In this embodiment, the temperature sensor 210 may be in communication with a radio transmitter. As illustrated in FIG. 5, the printed circuit board 230 may include a trace antenna 240 for transmitting the signal provided by the temperature sensor 210. In an embodiment, the signal transmitted to the electronic control portion 28 may be in the form of Wi-Fi radio waves. Where the signal transmitted to the electronic control portion 28 is in the form of Wi-Fi radio waves, the temperature sensor 210 and the electronic control portion 28 may communicate peer-to-peer or communicate via a wireless access point or hub (not depicted).

As illustrated in FIGS. 2, 4, and 5, in an embodiment, the integrated sensor apparatus 8 includes a power source 245 to provide power to the pressure sensor 205 and the temperature sensor 210. In an embodiment, the power source is provided adjacent the pressure and temperature sensors 205, 210. In an embodiment where the power source 245 comprises an electric battery, an access 215 to the power source 245 may be provided in the integrated sensor apparatus 8 to allow the electric battery to be repaired or replaced if needed.

In an embodiment, the power source 245 stores energy which can then be provided to the pressure and temperature sensors 205, 210 when required. In an embodiment, the power source 245 is a capacitor. The energy provided by the power source 245 can also be utilized to provide the signals from the pressure and temperature sensors 205, 210 to the electronic control portion 28.

When the power source 245 is an electric battery or a capacitor, the energy stored and provided by the power source 245 can be maintained via recharging. The power source 245 can be recharged utilizing kinetic energy. In one such embodiment, the integrated sensor apparatus 8 includes a kinetic energy device 220. The kinetic energy device 220 is provided in electrical communication with the power source 245. The kinetic energy device 220 receives mechanical energy and converts the mechanical energy into electrical energy. The electrical energy produced by the kinetic energy device 220 is then communicated to the power source 245 for storage and/or use. In an embodiment, the kinetic energy device 220 receives mechanical energy due to the rotation of the tire 50. In another embodiment, the kinetic energy device 220 receives mechanical energy from the flow of pressurized air through the integrated sensor apparatus 8.

As illustrated in FIGS. 2, 4, and 5, in an embodiment, the kinetic energy device 220 comprises a trace coil 250 of the printed circuit board 230. The trace coil 250 may be disposed partially or completely about the printed circuit board 230. The kinetic energy device 220 may further comprise a magnet 255 rotatable about the printed circuit board trace coil 250. The magnet 255 may be coupled with an interior of a sensor housing 260. In one embodiment, the sensor housing 260 includes an annular guide 265 protruding from an inner surface 270. In one embodiment, the guide 265 may comprise a rail. The magnet 255 may include a channel 257 for coupling the magnet 255 with the guide 265. Thus, the magnet 255 may be supported on and directed by the guide 265 as the magnet 255 rotates about the printed circuit board trace coil 250. In this embodiment, the kinetic energy device 220 utilizes electromagnetic induction to charge the power source 245.

In another embodiment, as illustrated in FIG. 6, the kinetic energy device 220 may generate energy from the fluid flow through the third housing fluid conduit 202 when tire pressure is increased or decreased. The kinetic energy device 220 may comprise a rotor 275 and a generator 280. The rotor 275 may include at least one airfoil 285 having an axis of rotation oriented parallel with a shaft 290.

In embodiments where one or more of the pressure sensor 205 and the temperature sensor 210 are of the wireless variety and one or more of the signals provided by the pressure sensor and the temperature sensor are in the form of one or more radio waves, the electronic control portion 28 comprises a receiver 82 capable of receiving radio frequency transmissions. In an embodiment, the receiver 82 is capable of receiving Wi-Fi radio waves. The pressure/temperature sensor 205, 210 signals may be decoded and utilized by the electronic control portion 28 to adjust the tire pressure. The pressure/temperature sensor 205, 210 signals may also be sent to the operator control device 32 or another device to display tire pressure and temperature information. It will be recognized by those skilled in the relevant art that a unique identification code is encoded in the signals. The unique identification code indicates whether the associated data is from, for example, the integrated sensor apparatus 8 or the integrated sensor apparatus 8A. The unique identification codes ensure that the control unit 14 makes the required tire pressure adjustments, via the associated conduit or conduits, to the wheel assembly sending the signal initiating the pressure adjustment.

Despite the position of the pressure sensor 205 and the temperature sensor 210 in a location removed from and remote from the control unit 14, pressurized fluid does not need to be transferred to the control unit 14 via the rotary assembly 58 to determine the tire pressure and the temperature of the pressurized fluid in the tire 50. Thus, utilizing the integrated sensor apparatus 8 and tire inflation system 12 described herein reduces wear on the air seals in the rotary assembly 58.

Further, because the pressure sensor 205 and the temperature sensor 210 are not housed in the tire 50, servicing one of the sensors 205, 210 is made easier. Additionally, because the pressure sensor 205 and the temperature sensor 210 are not housed in the tire 50, the sensors do not need to be removed from the tire 50 to be reprogrammed should the tire 50 need to be removed from the vehicle or repaired.

While various embodiments of the presently disclosed subject matter have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. An assembly for a central tire inflation system, comprising:
   a housing configured to be positioned external to a tire comprising the central tire inflation system, the housing extending between a first end and a second end;
   a fluid conduit defined by said housing disposed through said first and second ends, said first end configured to be sealably connected to a tire stem or opening so as to provide a fluid path from said fluid conduit into the tire;
   at least one sensor having a portion disposed in said fluid conduit;
   a power source configured to be positioned external to the tire and in electrical communication with said at least one sensor; and
   a kinetic energy device configured to be positioned external to the tire and in electrical communication with said power source.

2. The assembly according to claim 1, wherein said at least one sensor comprises a pressure sensor.

3. The assembly according to claim 1, wherein said at least one sensor comprises a temperature sensor.

4. The assembly according to claim 1, wherein said power source comprises an electric battery.

5. The assembly according to claim 1, wherein said power source comprises a capacitor.

6. The assembly according to claim 1, wherein said at least one sensor is in electrical communication with an antenna for transmitting a signal to an electronic control portion.

7. The assembly according to claim 6, further comprising:
   a unique identification code encoded in said at least one sensor signal.

8. The assembly according to claim 1, wherein said kinetic energy device comprises:
   an annular printed circuit board disposed about said housing, wherein said printed circuit board includes a trace coil disposed at least partially thereabout and in electrical communication with said power source;
   a sensor housing disposed about said printed circuit board and said at least one sensor;
   a guide disposed at least partially about said trace coil and coupled with an internal surface of said sensor housing; and
   a magnet slideably coupled with said guide for rotation about said trace coil.

9. The assembly according to claim 8, wherein said printed circuit board includes a trace antenna in electrical communication with said at least one sensor or transmitting a signal to an electronic control portion.

10. The assembly according to claim 1, wherein said kinetic energy device comprises:
    a rotor disposed in said fluid conduit;
    a shaft coupled with said rotor for rotation therewith; and
    a generator disposed adjacent said housing, said generator coupled with said shaft and in electrical communication with said power source.

11. The assembly according to claim 1, further comprising:
    a first valve housing coupled with a second valve housing, said second valve housing coupled with said housing second end; and
    a valve assembly disposed in said second valve housing.

12. The assembly according to claim 11, further comprising:
    a hose member coupled with said first valve housing opposite said second valve housing, wherein said hose member is in fluid communication with a wheel end rotary joint; and
    a pressurized fluid reservoir in selective fluid communication with a said wheel end rotary joint.

13. The assembly according to claim 1, further comprising:
    the tire stem coupled with a first end of said housing, wherein said tire stem is in constant fluid communication with said housing fluid conduit.

14. The assembly according to claim 13, wherein said at least one sensor is disposed adjacent the tire stem.

15. An assembly for a central tire inflation system, comprising:
    a housing having a first end and a second end;
    a fluid conduit defined by said housing disposed through said first and second ends;
    at least one sensor having a portion disposed in said fluid conduit;
    a power source in electrical communication with said at least one sensor; and
    a kinetic energy device in electrical communication with said power source, wherein said kinetic energy device comprises:
    an annular printed circuit board disposed about said housing, wherein said printed circuit board includes a trace coil disposed at least partially thereabout and in electrical communication with said power source;
    a sensor housing disposed about said printed circuit board and said at least one sensor;
    a guide disposed at least partially about said trace coil and coupled with an internal surface of said sensor housing; and
    a magnet slideably coupled with said guide for rotation about said trace coil;
    or said kinetic energy device comprises:
    a rotor disposed in said fluid conduit;
    a shaft coupled with said rotor for rotation therewith; and
    a generator disposed adjacent said housing, said generator coupled with said shaft and in electrical communication with said power source.

16. The assembly according to claim 15, wherein said printed circuit board includes a trace antenna in electrical communication with said at least one sensor or transmitting a signal to an electronic control portion.

17. An assembly for a central tire inflation system, comprising:
    a housing having a first end and a second end;
    a fluid conduit defined by said housing disposed through said first and second ends;
    at least one sensor having a portion disposed in said fluid conduit;
    a power source in electrical communication with said at least one sensor;

a kinetic energy device in electrical communication with said power source;

a first valve housing coupled with a second valve housing, said second valve housing coupled with said housing second end;

a valve assembly disposed in said second valve housing;

a hose member coupled with said first valve housing opposite said second valve housing, wherein said hose member is in fluid communication with a wheel end rotary joint; and a pressurized fluid reservoir in selective fluid communication with a said wheel end rotary joint.

* * * * *